United States Patent Office 3,205,203
Patented Sept. 7, 1965

3,205,203
PARTICULATE POLYSULFIDE POLYMERS AND METHOD OF MAKING THE SAME
Mayer M. Swaab, Princeton, and Burton J. Sutker, Levittown, N.J., assignors to Thiokol Chemical Corporation, Bristol, Pa., a corporation of Delaware
No Drawing. Filed Apr. 18, 1962, Ser. No. 188,562
6 Claims. (Cl. 260—79.1)

This invention relates to solid, finely particulate polysulfide polymer compositions and to a method of making the same.

In a number of the applications in which polysulfide polymers are currently used, the polymers are employed in finely particulate, rather than in massive, form, i.e. either in the form of a latex or as a finely divided solid. For example, polysulfide polymers are used in latex form as agricultural spray material. It has been found that when a latex is mixed with a biologically active material such as an insecticide or fungicide and sprayed on foliage, the polymer acts as a efficient "sticker" to improve the adherence of the insecticide to the foliage and to inhibit its removal by rain, wind and other climatic erosive agencies. This application of the polysulfide polymers is described in such U.S. patents as Steward, 2,470,529; Hopperstead, 2,530,770; and Hopperstead, 2,600,245.

It is evident that shipment of the polymer in the form of a dilute aqueous suspension such as a latex is uneconomic. Moreover such latices tend to break and agglomerate in storage. Hence for this agricultural application there is a need for a solid, concentrated product that remains stable in storage and that can be economically shipped to the point where it is to be used and easily and rapidly dispersed to form a latex at the time it is to be used.

It has also been found that polysulfide polymers can be advantageously incorporated in Portland cement mortars, especially those used in setting tiles. This application is disclosed in such U.S. Patents as Wagner, 2,820,713 and 2,962,467. It is evident that for this application also the polysulfide polymer should be in particulate, readily dispersible form so that it can be accurately proportioned and quickly dispersed in the mortar mixture.

The problem of producing finely particulate solid polysulfide polymers that are readily dispersible in water to form a reasonably stable latex has proven to be relatively difficult. In the conventional processes for producing polysulfide polymers such as, for example, those disclosed in Patrick U.S. Patents 2,195,380; 2,278,127; and 2,363,614, an organic dihalide is added to an aqueous solution of an alkaline polysulfide containing a dispersing agent such as magnesium hydroxide. The polymer forms as the disperse phase of a latex and hence is present in particulate form. However, the particulate polymers as thus produced have a strong tendency to agglomerate, and their particle size is not readily controllable. To some extent this difficulty can be overcome by using a dusting powder to prevent agglomeration of the particles as disclosed in Taylor U.S. Patent 2,390,853. However, an apparently insurmountable problem is presented by the fact that the polymer particles formed in this conventional process, irrespective of the method by which they are recovered from the latex in which they are formed, cannot be redispersed in water to form a new latex of acceptable stability.

One effort to circumvent this problem is disclosed in Fettes et al. U.S. Patent No. 2,925,362. In accordance with the Fettes et al. patent, an organic halide of the type commonly used in making polysulfide polymers is reacted with an aqueous solution of an alkali metal thiosulfate to form an organic thiosulfate known as a "Bunte" salt. The water is evaporated from the reaction product to form a dry material which can be readily pulverized. The resulting powder containing the Bunte salt is then mixed with a finely divided inorganic polysulfide to form a solid concentrated composition that can be readily stored and shipped. At the point of use the composition can be mixed with water, whereupon its components react to form a polysulfide polymer as the disperse phase of a latex.

While such dry mixtures of polysulfide polymer-generating ingredients constitute an important advance in this art, they are subject to certain limitations. The two components of the composition have somewhat different specific gravities and different particle sizes. There is thus a tendency for the ingredients to become partially segregated in their container during loading, shipment and unloading of the container. When such "demixing" occurs in transit, material removed from any particular part of the container at the point of use does not contain the proper relative proportions of Bunte salt and polysulfide reagent. One sample removed from the container may have an excess of Bunte salt and another sample an excess of polysulfide reagent.

Such mixtures are also quite sensitive to the presence of water. Minute amounts of water in either liquid or vapor form leaking into the containers in which the mixture is packaged cause a partial reaction between the ingredients and caking of the powder mixture within the container. The caked material cannot be dispersed in water to form a latex and hence is unusable for its intended purpose.

It is an object of the present invention to provide a polysulfide polymer in solid particulate form that is readily dispersible in water to form a stable latex. It is another object of the invention to provide a finely particulate polysulfide polymer that is stable in storage, free-flowing, and does not become sticky or agglomerate in the presence of moisture. It is still another object of the invention to provide a simple effective method of making such a particulate redispersible polysulfide polymer. Other objects of the invention will be in part obvious and in part pointed out hereafter.

The present invention is based on the discovery that when a Bunte salt of the type described above is reacted in aqueous solution in the presence of a dispersing agent with an inorganic alkaline sulfide to form a polysulfide polymer latex and the freshly prepared latex is spray-dried, the polymer can be recovered in the form of a fine powder which, even after an extended storage period, is readily redispersible in water to form a stable latex. Polysulfide polymer-containing products can be prepared by the present method which have an average particle size of the order of 10 to 100 microns and which can be stored as long as 12 months without losing their ability to be dispersed in water to form a stable latex.

In carrying out the method of the invention, an organic polythiosulfate, which as noted above is a species of Bunte salt, is prepared by reacting an organic polyhalide with an alkali metal thiosulfate in aqueous solution in known manner. (The prefix "poly" as used herein in such terms as polythiosulfate, polyhalide, and polysulfide is intended to cover both two and more than two units.) The organic radical of the polyhalide is desirably of the type commonly used in the conventional processes for making polysulfide polymers, i.e. an aliphatic oxahydrocarbon or hydrocarbon radical having up to say 10 carbon atoms in its chain. Typical Bunte salts useful as reagents in the present method are given in Table I below wherein T indicates a thiosulfate radical $S_2O_3Na$.

TABLE I

*Thiosulfates of oxahydrocarbons*

A. Thiosulfates of ethers:

$$TC_2H_4OC_2H_4T$$
$$TC_2H_4OC_2H_4OC_2H_4T$$

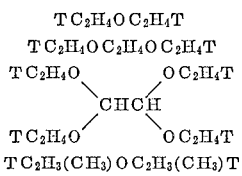

$$TC_2H_3(CH_3)OC_2H_3(CH_3)T$$

B. Thiosulfates of formulas:

$$TC_2H_4OCH_2OC_2H_4T$$
$$TC_2H_4OCH_2OC_2H_4OCH_2OC_2H_4T$$

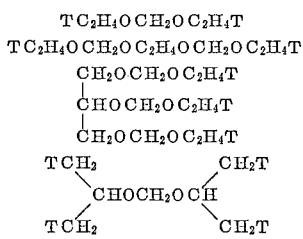

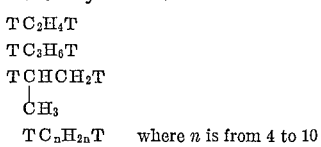

C. Thiosulfates of hydrocarbons:

$$TC_2H_4T$$
$$TC_3H_6T$$
$$TCHCH_2T$$
$$\quad |$$
$$\quad CH_3$$

$$TC_nH_{2n}T \quad \text{where } n \text{ is from 4 to 10}$$

As indicated above, the Bunte salt is reacted with an alkaline sulfide reagent which may be a hydrosulfide, monosulfide or polysulfide of an alkali metal or alkaline earth metal. Preferred sulfide reagents are the polysulfides of calcium and sodium. The nature of the reaction between the Bunte salt and each of these three types of sulfide reagent is illustrated by the following equations:

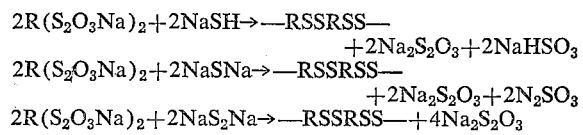

The relative proportions of the Bunte salt and alkaline sulfide reagent used are not particularly critical. Thus the reactants may be used in stoichiometrically equivalent amounts, or either reactant may be used in say 10% to 15% excess. The use of an excess of the Bunte salt is sometimes desirable since the products thereby produced are more nearly odor-free. On the other hand, if a product is desired which will produce a latex having somewhat sticky particles, as for example in agricultural sticker applications, an excess of the sulfide reagent may be used.

The reaction mixture in which the Bunte salt and sulfide reagent are reacted should also desirably include a dispersing agent in an amount of say 0.1% to 40% based on the weight of the polysulfide polymer produced. The preferred amount of dispersing agent is 5% to 30% of the polymer weight. Dispersing agents in general may be used for this purpose. Examples of useful dispersing agents are given in Table II below.

TABLE II (1) Alkyl aryl sulfonates, e.g., butyl naphthalene sulfonate
(2) Alkyl sulfates, e.g. lauryl sulfate
(3) Polymerized alkyl naphthalene sulfonates
(4) Polyoxyethylene ethers, e.g. polyoxyethylene ether of oleyl alcohol, polyoxethylene ether of alkylphenol (Emulphor O, Triton, X—100, Pluronics)
(5) Dioctyl sulfosuccinate
(6) Sodium lignin sulfonates
(7) Fatty acid esters of isethionic acid
(8) Fatty acid amides of methyl taurine
(9) Sodium salt of coconut fatty alcohol sulfoacetate
(10) Sodium salt of alkyl phenoxyethoxy ethyl sulfate
(11) Sodium salt of keryl benzene sulfonate
(12) Sodium salt of petroleum sulfonates
(13) Fatty acid esters of a polyether alcohol
(14) Coconut fatty acid diamide of diethanolamine
(15) Sorbitan monolaurate
(16) Magnesium hydroxide The above list includes both organic and inorganic dispersing agents and both ionic and nonionic types. It also includes certain liquids which may have to be incorporated in an inert carrier such as bentonite before being admixed with the reaction mixture of organic polythiosulfate and alkaline sulfide reagent.

The redispersible particulate polysulfide polymer of the present invention is prepared by spray-drying a freshly formed latex of the above type, that is, a latex resulting from the reaction in aqueous solution of a Bunte salt and an alkaline sulfide reagent in the presence of a dispersing agent. The latex is atomized in a suitable spray nozzle and sprayed into a moving stream of heated air at a temperature of say 300° to 600° F. Any suitable type of commercial spray dryer may be employed. The solid particles formed by spraying the latex into the heated air stream are separated in any suitable and well known separator, e.g. a cyclone separator, and packaged as desired.

Microscopic examination of the spray-dried particles reveals that in the dry state these particles have a uniform and regular spherical shape. To the extent that they cluster together, they resemble discrete bunches of grapes and upon slight agitation are easily separated into individual discrete particles. It has been found that the average particle size can be varied to some extent by varying the spray drying conditions. Typically the powder particles have an average particle size in the range of 10 to 100 microns.

The particulate polysulfide polymers formed in the manner described above can be readily dispersed in water to form latices in which the particles remain suspended for periods of about 30 minutes, after which they begin to settle to the bottom of the vessel in a nonagglomerated and discrete state. The stability of the latex and the fact that the particles thereof remain discrete even when they settle to the bottom of the container is a surprising and unexpected result, since non-spray-dried latices produced either by the conventional reaction of organic dichlorides and sodium polysulfide or by mixing solutions of Bunte salts and inorganic sulfides as previously known in this art begin to coagulate or agglomerate within five minutes after agitation of the latex has ceased and settle within about ten minutes thereafter as large nonuniform particles. Moreover, the polysulfide polymer particles produced by either of these prior known processes are incapable of being redispersed to form a new latex.

In order to point out more fully the nature of the present invention, the following specific examples are given of illustrative methods of preparing the present products.

EXAMPLE I

An aqueous solution of a Bunte salt was prepared by reacting 71.5 pounds of dichloroethylether $$(ClH_2C_2—O—C_2H_2Cl)$$

with 310 pounds of sodium thiosulfate ($Na_2S_2O_3$) in a solution containing 30 pounds of the sodium salt of polymerized alkylnaphthalene sulfonic acid (Darvan #1, marketed by R. T. Vanderbilt Co.) and 2.12 pounds of soda ash ($Na_2CO_3$) in 393 pounds of water. This solution contained the equivalent of 0.75 mol or 256.5 grams of Bunte salt per liter.

12.55 liters of this aqueous solution of Bunte salt were charged into a 10 gallon stainless steel reactor which was fitted with an agitator. To this was fed 5.45 liters of an aqueous lime sulfur solution containing 2.1 kg. of lime sulfur ($CaS_{4 \text{ to } 5}$) in the following manner: 0.6 liter per minute for the first six minutes, and 0.3 liter per minute thereafter. The Bunte salt and alkaline sulfide reacted to form a polysulfide polymer in the form of a finely particulate latex having a pH of about 6.9. To prevent coagulation of the latex, the reaction mixture was agitated continuously throughout the reaction period and thereafter until the latex was fed to a drier.

Drying of the latex was effected in the laboratory model spray drier manufactured by Bowen Engineering, Inc., using Bowen's SS #5 atomizer nozzle. The latex was fed into a glass separatory feed funnel from which it flowed by gravity to the atomizer nozzle. The latex feed rate was 280–350 ml./min. and the total amount of latex fed was 2840 ml.

The atomized latex was sprayed into a stream of air at 500° F. and 100 p.s.i.g. flowing at a rate of 12 lbs./hr., and the solid particles formed were separated from the air stream in a cyclone separator. A total of 1410 grams of free-flowing, off-white powder was collected having a particle size within the range 10 to 100 microns and a moisture content of 3.5%.

The powder as thus prepared was tested for dispersibility by adding 3 grams thereof to 150 ml. of water, stirring for 90 seconds and observing the extent to which it formed a reconstituted latex. It was found that the particulate product as produced above readily dispersed to form a latex, even after storage in a high humidity atmosphere for nine months at room temperature or 140° F. for one month. The particles remained suspended in discrete form without agitation for periods of about 30 minutes, after which they began to settle to the bottom of the container in a non-agglomerated state. The particles could be redispersed by merely swirling the container, even after standing in a settled condition for extended periods of time.

EXAMPLE II

A Bunte salt solution was prepared as in Example I except that it contained 314 grams/liter of the Bunte salt. 12.86 liters of the solution were charged to a 10 gal. stainless steel reactor equipped with an agitator. Then 5.14 liters of aqueous lime sulfur solution containing 1.98 kg. of lime sulfur were fed at the rate of 600 ml. for the first minute and 300 ml./min. thereafter into the reactor. Agitation was maintained in the vessel throughout the charging period and until the latex was fed to the drier. The latex had a solid content of 39% by weight and a specific gravity of 1.243. Four spray drying runs were made on the foregoing latex under different conditions as indicated below:

| Run No. | 1 | 2 | 3 | 4 |
|---|---|---|---|---|
| Feed Rate, ml./min | 100–160 | 200–300 | 400–450 | 200–260 |
| Amount Fed, ml | 1,000 | 1,000 | 1,500 | 5,200 |
| Air Stream Temperature, ° F. | 300 | 400 | 600 | 400 |
| Product, grams | 415 | 445 | 720 | 2,505 |
| Percent Moisture in product | 3.5 | 3.3 | 2.0 | |
| Bulk Density—Loose, #/ft.$^3$ | 20.7 | 20.5 | 24.3 | |
| Bulk Density—Tapped, #/ft.$^3$ | 25.8 | 29.4 | 35.7 | |

In each case an off-white, free flowing product was obtained which, when tested for dispersibility after two weeks storage at 140° F., was found to be easily redispersible in water.

EXAMPLE III

In the procedure of the present example the Bunte salt and alkaline sulfide were mixed immediately prior to their introduction into the atomizer, and thus the reaction took place, at least in part, within the atomizer.

The materials used were a Bunte salt solution prepared as in Example I and a lime sulfur solution containing 372 grams/liter of lime sulfur (29% by weight). The Bunte salt solution at 100 to 160 ml./min. and the lime sulfur solution at 20 to 37.5 ml./min. were fed to and mixed in a conduit directly connected to the atomizer. 2.51 liters of the Bunte salt solution and 0.6 liter of the lime sulfur solution were used.

The atomizer employed as a Bowen turbine-driven centrifugal spray machine having Bowen's #2 CSE atomizer wheel rotating at 45,000 r.p.m. The rapidly spinning wheel accelerated and atomized the feed material into fine droplets which were projected into a hot air stream having the same temperature, pressure and flow rate as in Example I. The tear impact of the high speed droplets entering the air stream further atomized them to form a fog-like mist. Evaporation of water from the mist particles produced a fine powder that was recovered from the air stream in a centrifugal separator. 1355 grams of an off-white, free-flowing, moisture-free and odor-free product were obtained.

EXAMPLE IV

An ethylene Bunte salt was formed in solution by reacting 49.5 lbs. of ethylene dichloride with 310 lbs. of sodium thiosulfate ($Na_2S_2O_3 \cdot 5H_2O$) in the presence of 27 pounds of the dispersing agent of Example I, 2.12 lbs. of soda ash ($Na_2CO_3$) to control the pH, and 383 lbs. of water. The pH of the solution was about 7. The resultant solution contained the equivalent of 0.69 mol/liter or 206 grams/liter of the Bunte salt.

The spray drier used was the same as that of Example III and the Bunte salt solution was mixed with a 29% by weight lime sulfur solution immediately prior to its introduction into the atomizer of the spray drier. The feed rates were 115 to 166 ml./min. for the Bunte salt solution and 25 to 40 ml./min. for the lime sulfur solution. A total of 2040 ml. of Bunte salt solution and 430 ml. of lime sulfur solution were fed to the drier. The drying air stream conditions were as in the previous examples.

An off-white free-flowing product was obtained which was readily dispersible in water to form a re-constituted latex.

EXAMPLE V

A 10-gallon stainless steel reactor fitted with an agitator was charged with 9.22 liters of a solution of ethylene thiosulfate Bunte salt prepared as described in Example IV. To this were added 2.78 liters of an aqueous solution of lime sulfur containing 1.035 kg. of $CaS_{4 \text{ to } 5}$. The resultant latex was agitated throughout the reaction period and until it was fed into the spray drier.

The spray drier and drying conditions used were the same as in Example I. A total of 11.9 liters of the latex was fed to the drier at 195 to 270 ml. per min.

The polysulfide polymer product obtained comprised 2.52 kg. of off-white, free-flowing fine powder.

EXAMPLE VI

The Bunte salt solution used in this example was prepared as described in the first paragraph of Example I. 1350 grams of magnesium chloride and 263 grams of sodium hydroxide were dissolved in 7.85 liters of this solution, and then 2.15 liters of an aqueous lime sulfur solution containing 800 g. of lime sulfur were added thereto. The magnesium chloride and sodium hydroxide reacted to form magnesium hydroxide in situ which assisted in preventing agglomeration of the latex prior to spray drying. Thus the reaction mixture contained both an organic and an inorganic dispersant. The mixture was agitated continuously until fed to the drier. The spray drier and drying conditions used were the same as in Example I. The latex was fed to the atomizer at 190 to 280 ml./min., and a total of 11.25 liters was fed. A total of 3600 grams of an off-white, free-flowing, readily dispersible powder was recovered.

EXAMPLE VII

The Bunte salt solution used in this example contained ethylene dithiosulfate and was prepared as described in the first paragraph of Example IV. A latex suspension was prepared by adding 2.23 liters of lime sulfur solution containing 830 grams of lime sulfur to 7.77 liters of the Bunte salt solution in which 1350 grams of magnesium chloride and 263 grams of sodium hydroxide were dissolved. The magnesium chloride and sodium hydroxide reacted to form magnesium hydroxide in situ. Thus the latex contained both an organic and an inorganic dispersant.

The latex was spray dried using the drier and drying conditions of Example I. The latex feed rate was 200 to 288 ml./min. and 11.35 liters were fed to the drier. A total of 4305 grams of a light yellow, free-flowing polysulfide polymer powder was recovered.

From the foregoing descriptions and examples, it should be apparent that the polysulfide polymer powders produced by the present process possess unique properties not shared by the particulate products of the prior art. The present products remain discretely particulated under a variety of adverse circumstances. Thus they may be stored for extended periods in a humid atmosphere and still retain their free-flowing character. They are readily dispersible in water to form reconstituted latices having stabilities significantly greater than the prior art polysulfide polymer latices. Perhaps most surprising of all is the fact that when the reconstituted latices are allowed to settle over an extended period of time, the particles do not agglomerate or cake at the bottom of the container and can be completely redispersed in the supernatant liquid by merely swirling the container.

Another advantage of the present products is that they are of more nearly uniform composition than prior products and hence can be more accurately proportioned when they are incorporated in other media such as for example Portland cement compositions. When used as agricultural stickers they are equal in effectiveness to and much more convenient and economical to use than polysulfide products previously used for this application. Also the present products are comparatively free from the unpleasant odors of many of the prior polysulfide products.

It is of course to be understood that the foregoing examples are intended to be illustrative only and that numerous changes can be made in the ingredients, proportions and conditions disclosed therein without departing from the spirit of the invention as defined in the appended claims.

We claim:

1. A process for making a spray-dried solid, particulate water-dispersible polysulfide polymer composition which comprises forming a latex which is an aqueous dispersion of the reaction product of an organic polythiosulfate wherein the organic radical is selected from the group consisting of oxahydrocarbon and aliphatic hydrocarbon radicals having up to 10 carbon atoms and a reagent selected from the group consisting of alkali metal and alkaline earth metal monosulfides, polysulfides, and sulfahydrates, said latex including from 0.1% to 40% of a dispersing agent based on the weight of said reaction product, atomizing the freshly prepared latex and spraying the atomized latex into a body of heated air to form water-dispersible polymer particles.

2. A process according to claim 1 and wherein said polythiosulfate is a dithiosulfate.

3. A process for making a spray-dried solid, particulate water-dispersible polysulfide polymer composition which comprises forming a latex which is an aqueous dispersion of the reaction product of (1) an organic dithiosulfate of a metal selected from the alkali and alkaline earth metals wherein the organic radical is selected from the group consisting of oxahydrocarbon radicals and aliphatic hydrocarbon radicals having up to 10 carbon atoms, and (2) an alkaline polysulfide, said latex including from 5 to 30% of a dispersing agent based on the weight of said reaction product, atomizing the freshly prepared latex and spraying the atomized latex into a body of heated air to form water-dispersible particles.

4. A process according to claim 3 wherein said dispersing agent is magnesium hydroxide.

5. A process according to claim 3 and wherein said dispersing agent is a sodium salt of a polymerized alkylnaphthalene sulfonic acid.

6. A spray-dried solid, particulate water-dispersible composition, the particles of which comprise a mixture of polysulfide polymer and from 0.1 to 40% by weight of dispersing agent, said particles having an average particle size in the range 10 to 100 microns.

References Cited by the Examiner

UNITED STATES PATENTS

| | | | |
|---|---|---|---|
| 1,869,703 | 8/32 | MacLachlan | 159—4 |
| 2,800,463 | 7/57 | Morrison | 260—29.1 |
| 2,925,362 | 2/60 | Fettes et al. | 260—79.1 |

LEON J. BERCOVITZ, *Primary Examiner.*

UNITED STATES PATENT OFFICE
CERTIFICATE OF CORRECTION

Patent No. 3,205,203 September 7, 1965

Mayer M. Swaab et al.

It is hereby certified that error appears in the above numbered patent requiring correction and that the said Letters Patent should read as corrected below.

Column 7, line 17, for "particulated" read -- particulate --; column 8, line 9, for "sulfahydrates" read -- sulfhydrates --.

Signed and sealed this 22nd day of March 1966.

(SEAL)
Attest:

ERNEST W. SWIDER
Attesting Officer

EDWARD J. BRENNER
Commissioner of Patents